United States Patent
Becker et al.

[11] Patent Number: 6,073,639
[45] Date of Patent: Jun. 13, 2000

[54] METHOD OF MANUFACTURING COLOR CRT'S

[75] Inventors: Heinz Becker; Rolf Reidinger, both of Ebersbach, Germany

[73] Assignee: Matsushita Electronics (Europe) GmbH, Esslingen, Germany

[21] Appl. No.: 08/935,509

[22] Filed: Sep. 23, 1997

[30]  Foreign Application Priority Data

Sep. 27, 1996  [EP]  European Pat. Off. .............. 96115576

[51] Int. Cl.⁷ ...................................... B08B 9/00
[52] U.S. Cl. ...................... 134/25.4; 134/22.1; 134/22.19
[58] Field of Search .............................. 134/25.4, 1, 22.1, 134/22.19

[56]  References Cited

U.S. PATENT DOCUMENTS

| | | | |
|---|---|---|---|
| 4,882,214 | 11/1989 | Hecq | 428/141 |
| 4,974,616 | 12/1990 | Lee | 134/1 |
| 5,012,155 | 4/1991 | Datta et al. | 313/461 |
| 5,114,494 | 5/1992 | Remec | 134/1 |

FOREIGN PATENT DOCUMENTS

| | | |
|---|---|---|
| 2 570 827 | 3/1986 | France . |
| 33 16 399 | 11/1984 | Germany . |
| 57-84547 | 8/1982 | Japan . |
| 2 226 492 | 7/1990 | United Kingdom . |

*Primary Examiner*—Randy Gulakowski
*Assistant Examiner*—Yolanda E. Wilkins
*Attorney, Agent, or Firm*—Wenderoth, Lind & Ponack, L.L.P.

[57] ABSTRACT

The invention refers to a method of manufacturing color CRTs, in which the reject rate is reduced in by increasing the viscosity of the cleaning bath.

14 Claims, 2 Drawing Sheets

METHOD OF MANUFACTURING COLOR CRT'S

BACKGROUND OF THE INVENTION

The present invention refers to a method of manufacturing a color CRT having a glass body including a cone and a front shell having side walls and a frit surface.

Before soldering the front shell to the cone of a color CRT, connecting surfaces and the inner surface of the side wall of the front shell are cleaned of graphite conductivity suspension. This cleaning always includes the risk of damaging the coating on the inner front surface side of the front shell.

The cleaning processes are usually carried out during the coating processes. According to a sensible embodiment, the cleaning is performed between applying a graphite suspension and coating with a first fluorescent layer.

Originally, this cleaning was performed mechanically by means of small and big brushes and by means of a cleaning liquid, wherein the device was especially adapted to the contour of the front shell edges. An adaptation of the cleaning method to new screen formats (e.g. 16:9) or different screen sizes was very expensive.

Submerging baths that are used for cleaning, have the advantage that they do not have to be adapted to different screen formats and sizes.

Favorable cleaning results can be achieved by hydrofluoric acid submerging baths. The material most suitable for that purpose is ammonium bifluoride, since the respective diluted solution removes the graphite conductivity suspension and is relatively harmless regarding safety factors. Ammonium bifluoride is therefore used by most of the manufacturers of color CRTs for removing the graphite conductivity suspension.

During cleaning of the connecting surfaces and the inner surfaces of the side walls of the front shell, the graphite conductivity suspension layer is damaged by dashes, whereby rejects are produced.

SUMMARY OF THE INVENTION

Thus, the object of the invention is to reduce the reject rate.

This object is solved by a method comprising cleaning an inner surface of the side walls and the frit surface of the front shell by submerging the inner surface of the side walls and the frit surfaces of the front shell into a cleaning liquid having a viscosity which corresponds to at last 5 mPas at 25° C., and subsequently soldering the front shell to the coned to form the glass body.

To increase the viscosity, a material is preferably used which is soluble and highly molecular and which does not react with the other materials contained in the cleaning liquid. Such a material has the advantage that it only increases the viscosity of the cleaning liquid but does not influence the cleaning ability of the liquid, in particular the removal of graphite conductivity suspension.

According to a special embodiment of the invention, the material polyvinyl pyrrolidone (PVP) can be used for this purpose, which does not only not influence the cleaning effect but also does not introduce a new material into the manufacturing process which was not already used previously in the manufacture of the screen.

According to a special embodiment of the invention, hydrofluoric acids or the salts thereof dissolved in water may be used for removing the graphite conductivity suspension from the glass surfaces, wherein the saline solutions—usually an ammonium bifluoride solution is used—on one hand remove the graphite conductivity suspension from the glass surfaces and on the other hand are relatively harmless for the human being, especially for the operating personnel.

The above described advantages can be very advantageously combined, if a cleaning liquid is used which substantially has the following composition: 8% ammonium bifluoride, 3% polyvinyl pyrrolidone, and 89% water. Such a cleaning liquid has very favorable cleaning properties, it is relatively harmless for the human being, it leads to a low reject rate and is moreover relatively inexpensive.

The submerging depth of of the front shell (the lateral surfaces should be at least 0.6 times the distance of the frit surface to the inner surface of the screen. In this submerging depth, the lowest error rate and the highest high tension stability in the connection of the shell and the cone can be achieved by means of the cleaning liquid according to the invention. Additionally, the risk is minimized that interfering particles from the area of the pins reach the inner surface of the shell (risk of tinsel).

BRIEF DESCRIPTION OF THE DRAWINGS

The invention will now be described with reference to the drawings.

DETAILED DESCRIPTION OF THE INVENTION

Figure 1:
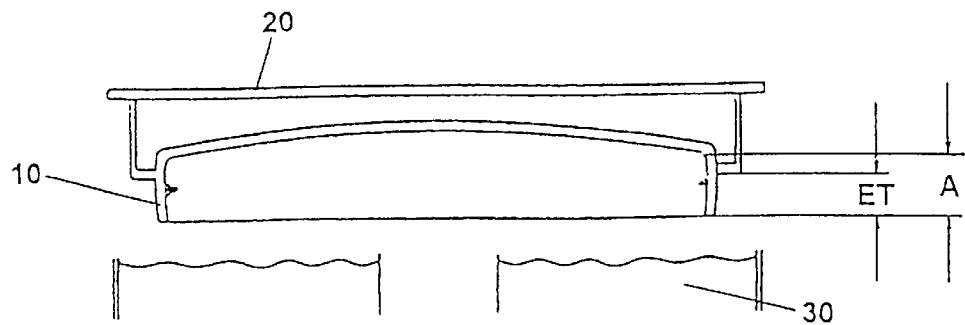
FIG. 1 is a sectional view of an arrangement for cleaning the frit surface and the side surface of a front screen in a bath.

An arrangement for cleaning a connecting surface (frit surface) and a inner surface of the side wall of a (front) screen is defined in FIG. 1. A front shell 10 is retained by a holding means 20 adapted to submerge the front shell 10 into the cleaning liquid 30.

Figure 2:
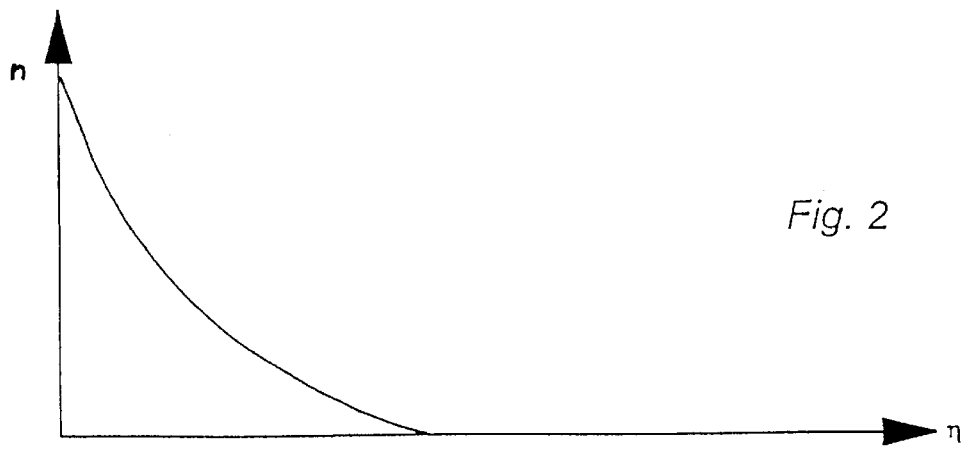
FIG. 2 is a diagram which defines the dependency of the number of impurities on the bath viscosity.
Figure 3:
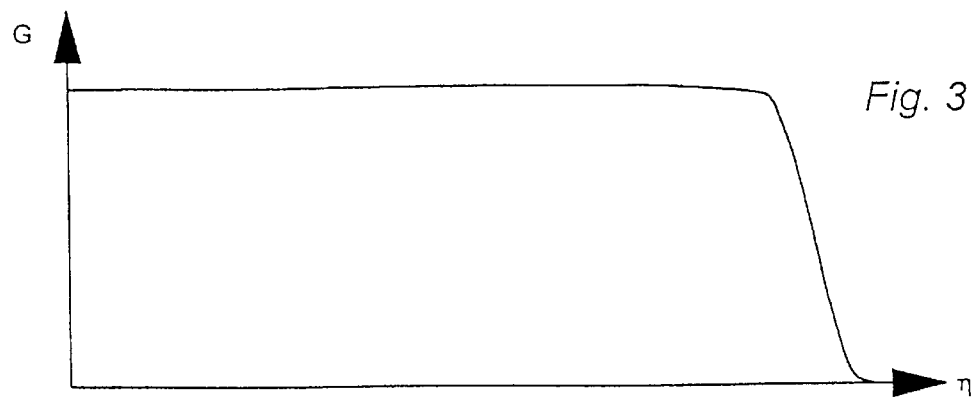
FIG. 3 is a diagram which defines the dependency of the cleaning quality on the bath viscosity.

A great number of tests were carried out in order to detect the parameters of an optimum cleaning process at a minimum reject rate. It turned out that an increase of the viscosity of the cleaning liquid (of the submerging bath) leads to especially advantageous results. The test results that have lead to a definition of the optimum viscosity range are described by means of FIG. 2, FIG. 3 and FIG. 4. In FIG. 2, the dependency of the number n of impurities on the viscosity $\eta$ of the cleaning liquid is shown. It can clearly be seen that with an increase of the viscosity of the cleaning liquid, the number of impurities in the front screen significantly decreases. In order to ensure that, when the viscosity of the cleaning liquid increases, the quality of the cleaning process does not decrease, the dependency of the cleaning quality G was determined from the viscosity of the cleaning liquid (FIG. 3). It can be seen that the bath viscosity can be increased without any problems, but that negative effects on the cleaning quality occur at a certain viscosity value only.

Figure 4:
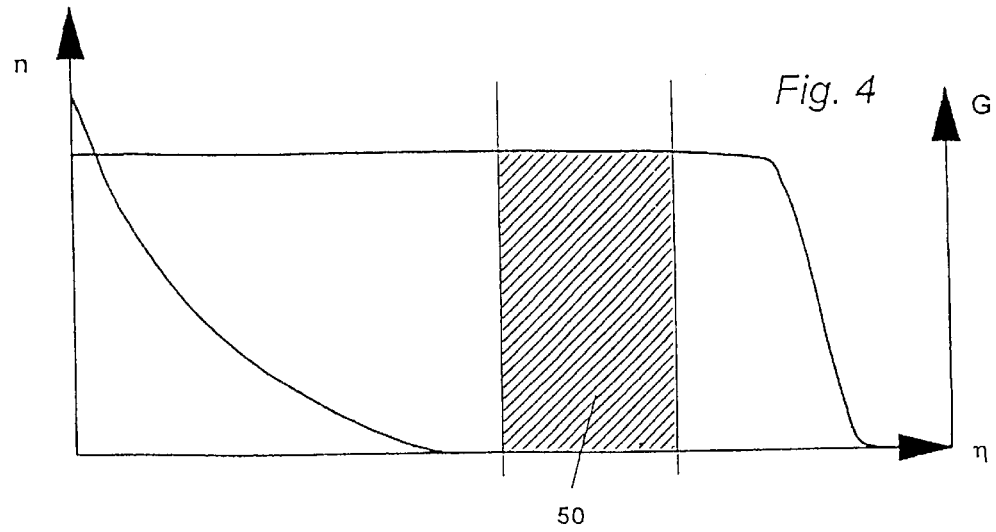
FIG. 4 is a diagram which defines the optimum working range in accordance with the bath viscosity.

It can be taken from the functional combinations shown in FIG. 2 and FIG. 3 that an optimum working range for the viscosity of the cleaning liquid is in the range 50 shown in hatched lines in FIG. 4. An optimum cleaning quality at a number of impurities as few as possible can only be achieved if, as shown in FIG. 4, the lower limit of the optimum viscosity range is defined such that the number of impurities has decreased to a minimum, and the upper limit is defined such that the cleaning quality of the cleaning liquid used is still on a high level. The range detected in this manner is between 25 and 35 mPas at 25° C.

Results that are still favorable are achieved if the range limits for the viscosity are extended only little, so that the negative effects of an increasing number of impurities and a decrease of the cleaning quality are not crucial. In the tests that were conducted, this was the case for a viscosity range that was between 15 mPas and 1000 mPas at 25° C.

Which viscosity for the cleaning liquid of front screens is optimal substantially depends on the submersion depth of the front shell, the speed at which the front shells are submerged into the cleaning liquid, and on the temperature of the cleaning liquid. A reduction of the submerging depth can be observed at a viscosity of cleaning liquid that corresponds to 5 mPas at 25° C. If the shells are submerged at a high speed into the cleaning liquid, a decrease of the advantageous effects cannot be observed even at a viscosity above 1000 mPas (at 25° C.): At an average submerging depth of the front shells into the cleaning liquid, the upper limit of the viscosity for achieving a very good result is between approximately 80 and 400 mPas (at 25° C.) according to the tests carried out.

To increase the viscosity of the cleaning liquid, all soluble, highly molecular materials are suitable that do not react with other materials existing in the cleaning liquid, in particular not with the ammonium bifluoride that is very advantageous for safety reasons.

It turned out to be of special advantage to use the material polyvinyl pyrrolidone (PVP), since in this manner new materials are not introduced into the manufacturing process.

A successively tested alternative for the cleaning liquid basically has the following composition:
ammonium bifluoride 8%
polyvinyl pyrrolidone 3%
water 89%.

Figure 5:
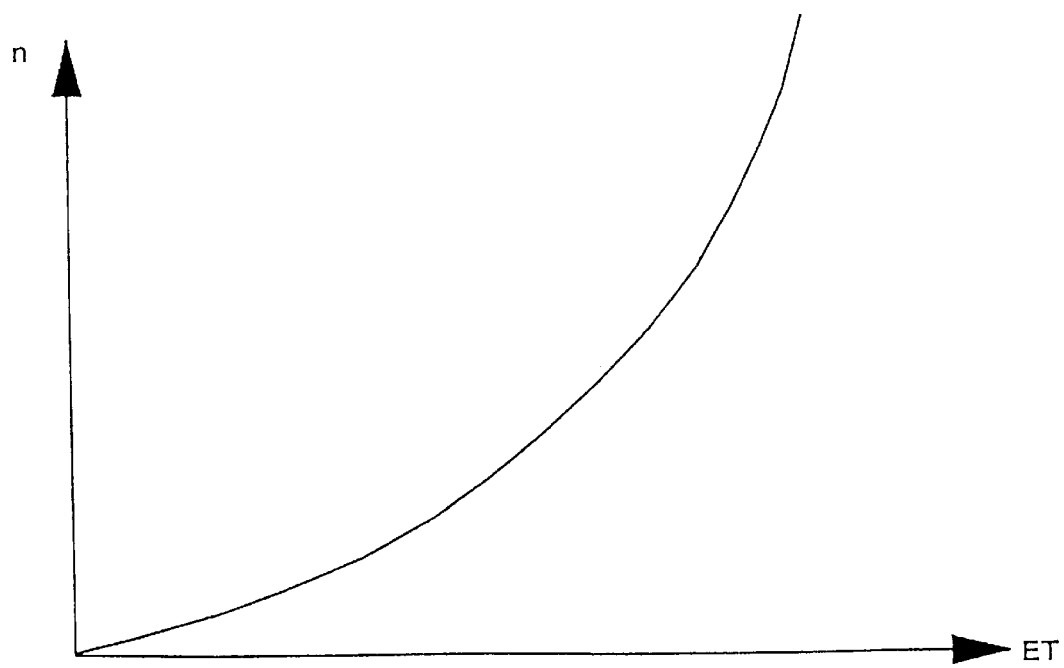
FIG. 5 is a diagram which defines number of impurities in accordance with the submerging depth.

In combination with the increased viscosity, the submerging depth also plays a predominant role on the number of impurities. Thus, it was detected how the number of impurities depends on the submerging depth of the lateral surface of the front shell. The result is shown in FIG. 5. It can be seen that, with an increase of the submerging depth ET, the number of impurities clearly increases, especially if the submerging depth is greater than 0.3 times the distance A of the connecting surface to the inner side of the screen. On the other hand, the high voltage stability of the connection of trough to cone clearly decreases and the risk of tinsel clearly increases if the submerging depth is less than 0.6 times the distance A of the connecting surface to the inner side of the screen. An ideal compromise for the submerging depth ES seems to be the range of 0.6 times the distance A of the connecting surface to the inner side of the screen, at which at a sufficiently high tension level and at a sufficiently low risk of tinsel, the number of impurities remains on a low level.

Further applications of a cleaning bath according to the invention can be found in all applications, in which dashes of the cleaning liquid formerly lead to damage of the product to be cleaned, which reduced the quality of the manufacturing process and usually lead to an increased reject rate.

What is claimed is:

1. A method of manufacturing a color CRT having a glass body including a cone and a front shell having side walls and a frit surface, said method comprising cleaning an inner surface of the side walls and the frit surface of the front shell by submerging said inner surface of the side walls and said frit surface of the front shell into a cleaning liquid having a viscosity which corresponds to at least 5 mPas at 25° C., and subsequently soldering said front shell to said cone to form said glass body.

2. A method according to claim 1, wherein the cleaning liquid contains a material for increasing the viscosity, which is soluble, highly molecular and which does not react with other materials contained in the cleaning liquid.

3. A method according to claim 1, wherein the cleaning liquid contains polyvinyl pyrrolidone for increasing the viscosity.

4. A method according to claim 1, wherein the cleaning liquid has a predetermined portion of soluble salts of hydrofluoric acids.

5. A method according to claim 1, wherein the cleaning liquid basically comprises the following composition:
8% ammonium bifluoride,
3% polyvinyl pyrrolidone, and
89% water.

6. A method according to claim 1, wherein a submerging depth of the side walls of the front shell into the cleaning liquid corresponds to at least 0.6 times the distance of the frit surface to an inner surface of a screen of the front shell.

7. A method according to claim 2, wherein the cleaning liquid contains polyvinyl pyrrolidone for increasing the viscosity.

8. A method according to claim 2, wherein the cleaning liquid has a predetermined portion of soluble salts of hydrofluoric acids.

9. A method according to claim 3, wherein the cleaning liquid has a predetermined portion of soluble salts of hydrofluoric acids.

10. A method according to claim 2, wherein the cleaning liquid basically comprises the following composition:
8% ammonium bifluoride,
3% polyvinyl pyrrolidone and
89% water.

11. A method according to claim 2, wherein a submerging depth of the side walls of the front shell into the cleaning liquid corresponds to at least 0.6 times the distance of the frit surface to an inner surface of a screen of the front shell.

12. A method according to claim 3, wherein a submerging depth of the side walls of the front shell into the cleaning liquid corresponds to at least 0.6 times the distance of the frit surface to an inner surface of a screen of the front shell.

13. A method according to claim 4, wherein a submerging depth of the side walls of the front shell into the cleaning liquid corresponds to at least 0.6 times the distance of the frit surface to an inner surface of a screen of the front shell.

14. A method according to claim 5, wherein a submerging depth of the side walls of the front shell into the cleaning liquid corresponds to at least 0.6 times the distance of the frit surface to an inner surface of a screen of the front shell.

* * * * *